T. S. Steadman.
No 986
Mower. Reissued Jun. 19, 1860.
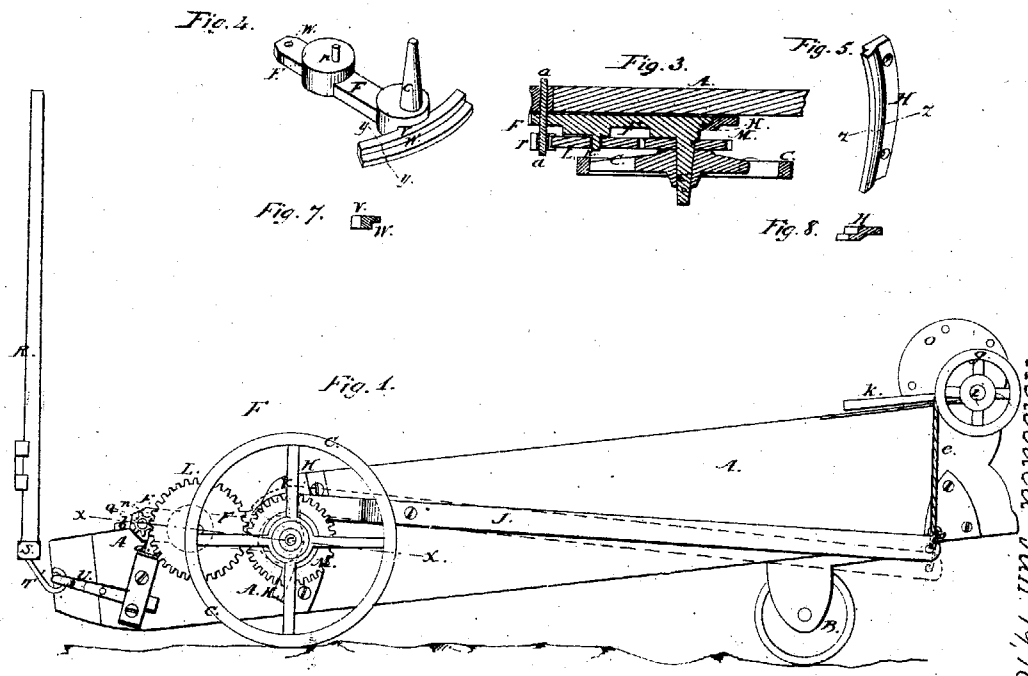
Witnesses;
Chl. J. Houck
Emanuel Rugel
M. M. Whitely Jr.

UNITED STATES PATENT OFFICE.

W. N. WHITELEY, JR., OF SPRINGFIELD, OHIO, ASSIGNEE OF T. S. STEADMAN.

IMPROVEMENT IN CLOVER AND GRASS SEED HARVESTERS.

Specification forming part of Letters Patent No. 10,967, dated May 23, 1854; Reissue No. 986, dated June 19, 1860.

DIVISION B.

*To all whom it may concern:*

Be it known that THOMAS S. STEADMAN, of Murray, in the county of Orleans and State of New York, invented certain new and useful Improvements in Clover and Grass Harvesters, of which the following is a full, clear, and exact description, reference being had to the annexed drawings, which make part of this specification.

This invention relates to that description of machine in which the main frame, carrying the cutting apparatus, and the master-wheel, which drives the cutters, are capable of moving up or down, each independently of the other, as the machine moves over the surface of the ground, so that the cutting apparatus may adapt itself to the unevenness of the ground over which the machine travels, while at the same time the master-wheel, the axle of which is not located in the same vertical plane that passes through the line of bearing of the cutting apparatus on the ground, may likewise follow the undulations of the ground's surface.

The invention which constitutes the subject of this application consists in so connecting the main frame or box of the machine, to which the fingers are attached, to the arm or supplementary frame on which the master-wheel axle is formed or fastened that each shall be kept always parallel with the others, while each is allowed to move up and down independently of the others, and the gearing carried by each frame kept constantly in connection during all their movements, as will be hereinafter fully described.

To enable those skilled in the art to make and use my invention, I will proceed to describe the method in which I have practiced the same, referring by letters to the accompanying drawings, forming part of this specification, and in which—

Figure 1 represents a side elevation of the machine. Fig. 2 represents a front elevation. Fig. 3 represents a cross-section at the line *x x* of Fig. 1. Fig. 4 represents a perspective view of the arm or supplementary frame. Fig. 5 represents a perspective view of the guide-plate of the arm or supplementary frame. Fig. 6 represents in detail views the arm or supplementary frame and gears. Fig. 7 shows a cross-section at *y y*, Fig. 4. Fig. 8 is a cross-section at the line *z z* of Fig. 5.

Similar letters denote the same parts in the different views.

A represents the main frame or box of the machine.

B is a caster-wheel near its center and rear end, on which the rear end rests for permitting the machine to turn freely.

C and D are two larger wheels, which serve to support the main frame or box when the guard-finger bar E (which is the front bar of the box A) is not resting on the ground, and one of which, C, is the master or main driving wheel of the machine. *c* is its axle, formed on or secured to and near the rear end of the arm or supplementary frame F, whose forward and vibrating end is hung on the projecting end of the pinion-shaft *a*, (which is confined to the main frame or box A by its boxes *b* and *b'*,) and there held by a flange-plate, *d*, which permits it to be slipped on and off of said shaft when turned on it.

The wheel D is hung on an arm or supplementary frame, G, similarly constructed, hung, and retained as that of F. These arms, the pinion-shaft, and main frame vibrate from the axles of the wheels C and D as fixed centers of motion, while they and the main frame vibrate from and around the pinion-shaft on the main frame or box as their centers, while the main frame or box rises toward or lowers from the axles of the ground-wheels C and D. These and the ends of the arms F and G are held parallel with the main frame A, and guided, in moving up and down by the side of the frame or box, by guide-plates H and I, fastened to the main frame or box, which forms with the frame a groove in which each arm is held as the main frame rises and lowers, while the fingers thereto attached pass over uneven surfaces.

J and J' are the levers by which the vibrations of the main frame are limited, and that limit varied, as will be seen by reference to Fig. 3.

*e* and *f* are cords by which the levers J and J' are operated, which pass over pulleys *g* and *h* on the outer ends of windlass-shafts *i* and *j*, which shafts are furnished with hand-levers *h* and *l*, which are checked or chocked by pins

*m* and *n*, placed in such of the holes in the plate or disk *o* as will give the desired limit of vibration to the main frame and finger-bar thereto attached, and vary said limit of vibration, as shown at Fig. 1 of the drawings.

L is the intermediate wheel, and P is its axle, formed on or secured to the arm or supplementary frame F. This intermediate wheel gears with the master-wheel gear M and the pinion *r* for driving the cutters, and also giving them the right motion, and is placed loosely on its shaft *a*, that it may readily be removed when not desired for driving the cutters, as is the case when driving the machine to and from the barn to unload it, &c.

E is the guard-finger bar of the box A.

S are the guard-fingers, and *t* are the cranks on the pinion-shaft *a*, confined by its boxes *b* and *b'*. The bars *u* and *u'*, which are hinged at their rear ends to swinging bars *v v'*, are pivoted to the upper edges of the frame A.

T is the cutter-bar attached to the bars *u* and *u'*. *x* are the cutters. Q is the rake. R are the shafts or thills between which the animal that draws the machine is hitched. These are hinged to the front of the main frame or box, for permitting it and the master-wheel to each have an independent action to the ground. As most of these latter-mentioned parts form the subject of applications A and C, no particular description of their operation need be here given.

It will be observed that the arm or supplementary frame F, on which the master-wheel axle C is formed or secured, is made with a curved portion, *r*, (see Figs. 3, 4, and 6,) which is curved on the arc of a circle, the center of which lies in the center of the hole *w*, into which the pinion-shaft *a* fits, and that this curved portion *r* is formed with a rabbet, W, (see Figs. 3 and 4,) to accommodate the lip of the retaining strap or plate H, which retaining-plate is screwed to the side of the main frame or box of the machine, as seen at Figs. 1 and 3.

It will be readily seen that when the main frame A and master-wheel axle and the arm or supplementary frame F are connected, as above described, they will each maintain a parallel position relatively to the others while one rises and the other lowers. The master-wheel will of course always follow the surface of the ground, unless its depressions are of less curvature than that of the wheel-periphery. It will also be seen that the lever, when in its position, (shown in red,) limits the vibration of the main frame A, or box carrying the fingers and cutters, and the arm or supplementary frame F, and when moved to that in black varies the limit of said vibration.

It will be understood that the arm or supplementary frame G is in all respects connected with the main frame A in the same manner as that of F. Thus it will be understood that I do not wish to limit my claim of invention to the precise manner of constructing the parts, such as I have adopted and found to work well.

What is claimed as the invention of the said THOMAS S. STEADMAN, and is desired to be secured by Letters Patent, is—

In combination with the main frame or box A and arm or supplementary frame F, on which is formed or secured the master-wheel axle, the employment of a retaining-arc, H, or its equivalent, the whole constructed and arranged in such a manner that the main frame or box and arm or supplementary frame, with its master-wheel axle, will be held in parallel planes relatively to each other while they are moving up and down, substantially as and for the purposes herein set forth.

In testimony whereof I have hereunto set my hand and affixed my seal this 27th day of March, 1860.

W. N. WHITELEY, JR. [L. S.]

Witnesses:
SOL J. HOUCK,
EMANUEL RIEGEL.